April 9, 1946. A. W. MORTON 2,398,030
OIL RINGS
Filed Oct. 24, 1944
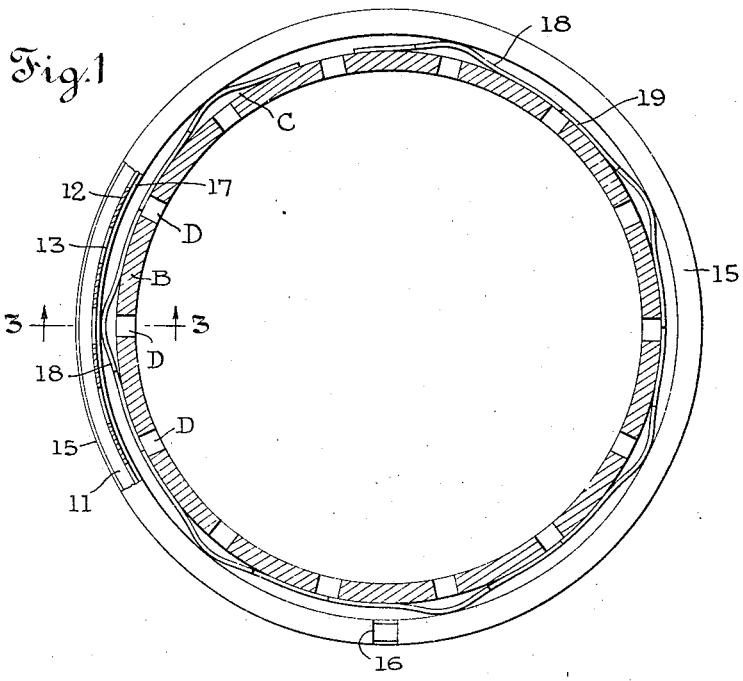
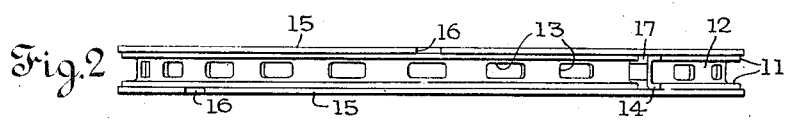
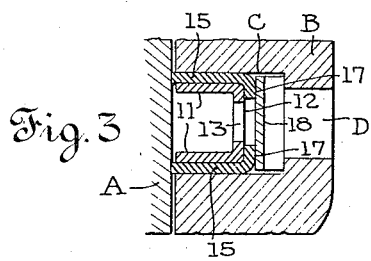 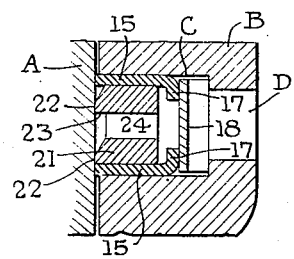
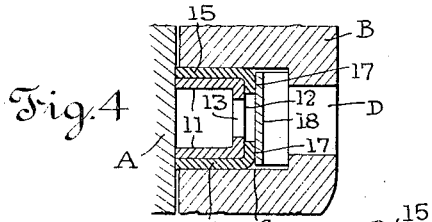 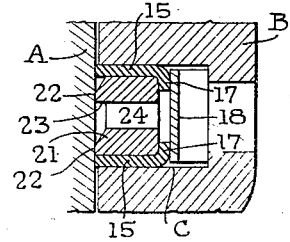
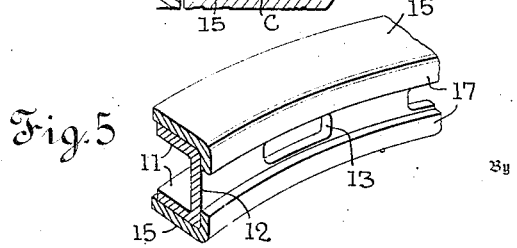
Inventor
Allen W. Morton
Attorneys Patented Apr. 9, 1946

2,398,030

UNITED STATES PATENT OFFICE 2,398,030

OIL RINGS

Allen W. Morton, Baltimore, Md., assignor to Koppers Company, Inc., Pittsburgh, Pa., a corporation of Delaware Application October 24, 1944, Serial No. 560,151

4 Claims. (Cl. 309—45)

This invention relates to piston rings and particularly to oil scraping rings intended for use in grooves having oil drainage ports. While the ring can be used for other purposes, it is intended primarily as a replacement ring for use in worn cylinders.

Many such rings have been proposed and a number have been commercially used with considerable success. One form which has demonstrated good oil control characteristics comprises thin plate-like split rings spaced by an intervening ring element which is ported or slotted to pass oil.

However, the useful life of such rings is not as long as is desired and they are subject to two conditions which impair performance. The first of these is clogging or gumming of oil ports in the middle or spacing element. This is caused, or at least intensified, by the effect of the expander in partly or wholly blinding certain of the oil ports, so that they tend to clog. The second is a wedging action which occurs if the expander slips past the inner edge of one of the thin plate-like rings. This may happen if the ring groove is a little over-wide as the result of wear.

The present invention provides an inexpensive and commercially practicable construction which overcomes both of the difficulties outlined above. It practically eliminates the tendency for oil ports to clog and it inhibits wedging action even in a worn groove.

Two useful embodiments of the invention are contemplated, one of which uses a channel shaped steel spacer ring, and the other of which uses a ported cast iron spacer ring having beveled scraping rims with intervening oil ports. Functionally, they differ in the fact that the steel spacer, though split, has little inherent expansive tendency, whereas the cast iron spacer can readily be given good expansive characteristics in cases where these are desired.

In the drawing:

Figure 1 is a transverse section through a piston, the section being taken through a ring groove having oil drainage ports. A ring assembly embodying the invention is shown in place, partly in section. The ring is of the type having a steel spacer and is shown as it would appear prior to wearing in.

Figure 2 is an edge view of the ring assembly shown in Figure 1.

Figure 3 is a section on the line 3—3 of Figure 1. In this view conditions prior to wearing-in are illustrated.

Figure 4 is a section similar to Figure 3 showing conditions after wearing in.

Figure 5 is a fragmentary perspective showing how the flanges on the scraping rings afford a continuous oil channel communicating with the oil ports in the spacer ring.

Figures 6 and 7 are views similar to Figures 3 and 4 showing the use of a cast iron spacer having an inherent expansive tendency. As in Figures 3 and 4 conditions before and after wearing in are illustrated.

In all views the cylinder is indicated at A, the piston at B, the ring groove in the piston at C and the oil drainage ports at D. These parts are conventional, and comprising no part of the invention, may assume the various forms known in the art.

The ring assembly, as shown in Figures 1 to 5 comprises a channel shaped spacer ring which is formed of steel and which has outward-directed parallel flanges 11 connected by a web 12, the web having through ports 13. The spacer ring has a gap 14, so that it can expand, but has only a rather feeble expansive tendency.

Mounted against the outer faces of flanges 11 are corresponding scraper rings 15 each having a gap 16 and an internal marginal flange 17 which underlies a portion of the spacer ring and limits the expansion of its scraper ring relatively to the spacer ring.

An ordinary expander 18, here shown as a strip of resilient steel formed to the familiar polygonal form (heptagonal in this case), is interposed between the bottom of ring groove C and the flanges 17. This expander has edge portions cut away as indicated at 19 so as to pass oil to the drain ports D. Any expander which will not blind ports D may be used, provided it will bear against the flanges 17 and leave an oil passage between the opposed margins of flanges 17. See Figures 3 to 5.

The parts are so dimensioned that when first installed they are in the condition illustrated (in somewhat exaggerated dimension) in Figure 3. The expander 18 reacts on flanges 17 and forces scraper rings 15 against cylinder wall A. The spacer ring is at this time merely a spacer and may not even contact cylinder wall A. Such contact as it might have would be negligible because of its feeble expansive tendency.

In consequence the scraper rings wear-in under a rather high unit pressure. When they are worn-in the spacer ring is engaged by the flanges on the scraper rings whereupon all three rings are expanded by the expander 18. Since the area of contact is then approximately doubled the unit pressure is halved. The invention thus affords a short run in period followed by a long useful life.

This is a valuable characteristic. Furthermore the ports 13 cannot be blinded by the expander, and the wide contact between the flanges 17 and the expander prevents wedging.

The invention can also be usefully applied by the use of a spacer which has an inherent expansive tendency. This possibility is illustrated in Figures 6 and 7 in which the parts 15 to 19 are the same in form as corresponding parts in Figures 1 to 5. In other words a different spacer ring is shown in Figures 6 and 7.

This spacer ring 21 would ordinarily be of cast iron and would have the usual gap so that the ring could expand. It is given a uniform expansive tendency by any of the procedures familiar in the piston ring art. Its periphery preferably is formed to afford two annular areas 22 which contact cylinder A with an intervening groove 23 from which oil ports 24 lead. Bevels lead to the areas 22 at their upper margins. This will be recognized as a known form of oil control ring.

Figure 6 shows in somewhat exaggerated dimension the conditions when the ring assembly is first installed. The rings 15 then absorb the full expansive tendency of expander 18 and ring 21 develops its own expansive tendency. After rings 15 have worn the expander reacts upon all three rings, as shown in Figure 7. Rings 15 may be designed to cause the conditions of Figure 7 to be reached after a short run-in period but good results can also be had by causing the conditions of Figure 7 to be attained only after the areas 22 of ring 21 have become well seated against the cylinder so that the supplemental expansion reaction of expander 18 upon ring 21 increases the effectiveness of that ring.

In restoring a worn piston-cylinder combination the precise effect will depend on the condition of that combination. Hence the operative characteristics vary, but the significant thing is that the ring assembly will accommodate itself to existing conditions, will not wedge, will not clog, is easy to install and economically and mechanically practicable.

What is claimed is:

1. A piston ring assembly for mounting in a ring groove, comprising in combination an expansible spacer ring having oil ports; a pair of expansible scraper rings, one on each side of the spacer ring, said scraper rings being relatively thin and having each a flange that overhangs the edge of the inner periphery of the spacer ring; and an expander arranged to react against the flanges of the scraper rings.

2. A piston ring assembly for mounting in a ring groove, comprising in combination a spacer ring having an oil scraping periphery and oil draining ports; a pair of thin expansible scraper rings, one on each side of the spacer ring, said scraper rings having each a flange which overhangs the inner periphery of the spacer ring while exposing the oil draining ports; and an expander arranged to react against the flanges of the scraper rings.

3. A piston ring assembly for mounting in a ring groove, comprising in combination a spacer ring having an inherent expanding tendency, an oil scraping periphery and oil draining ports; a pair of thin expansible scraper rings, one on each side of the spacer ring, said scraper rings having each a flange which overhangs the inner periphery of the spacer ring while exposing the oil draining ports; and an expander arranged to react against the flanges of the scraper rings.

4. A piston ring assembly for mounting in a ring groove, comprising in combination an expansible spacer ring having oil ports; a pair of expansible scraper rings, one on each side of the spacer ring, said scraper rings being relatively thin and having each a flange that overhangs the edge of the inner periphery of the spacer ring; and an expander arranged to react against the flanges of the scraper rings, said scraper rings and spacer ring being relatively so dimensioned when installed that the scraper rings absorb the entire reaction of said expander.

ALLEN W. MORTON.